(12) United States Patent
Hirasako

(10) Patent No.: US 11,731,606 B2
(45) Date of Patent: Aug. 22, 2023

(54) CONTROL DEVICE AND CONTROL METHOD FOR VEHICLE, AND NON-TRANSITORY COMPUTER READABLE MEDIUM

(71) Applicants: JATCO Ltd, Fuji (JP); NISSAN MOTOR CO., LTD., Yokohama (JP)

(72) Inventor: Kazuki Hirasako, Komae (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 8 days.

(21) Appl. No.: 17/638,779

(22) PCT Filed: Nov. 20, 2020

(86) PCT No.: PCT/JP2020/043398
§ 371 (c)(1),
(2) Date: Feb. 25, 2022

(87) PCT Pub. No.: WO2021/106784
PCT Pub. Date: Jun. 3, 2021

(65) Prior Publication Data
US 2022/0274581 A1 Sep. 1, 2022

(30) Foreign Application Priority Data

Nov. 29, 2019 (JP) ................................. 2019-216985

(51) Int. Cl.
*B60W 10/06* (2006.01)
*B60W 10/02* (2006.01)
(Continued)

(52) U.S. Cl.
CPC .......... *B60W 10/02* (2013.01); *B60W 10/026* (2013.01); *B60W 10/0235* (2020.02);
(Continued)

(58) Field of Classification Search
CPC . F16H 61/14; B60W 10/026; B60W 10/0235; B60W 10/06; B60W 10/11;
(Continued)

(56) References Cited

U.S. PATENT DOCUMENTS 7,670,262 B2 * 3/2010 Minaki ................. F16H 61/143
477/171
10,155,508 B2 * 12/2018 Matsunaga ........... F16H 61/143

FOREIGN PATENT DOCUMENTS

EP          1953057 A2 *  8/2008  ............ B60W 30/14
JP       2002-248935 A     9/2002

* cited by examiner

*Primary Examiner* — Roger L Pang
(74) *Attorney, Agent, or Firm* — Foley & Lardner LLP

(57) ABSTRACT

The lock-up control unit is configured to: in a case where the normal mode is selected, disengage the lock-up clutch when a vehicle speed decreases and reaches a first vehicle speed while the vehicle is traveling in a state where the lock-up clutch is engaged, in a case where the eco mode is selected, disengage the lock-up clutch when the vehicle speed decreases and reaches a second vehicle speed in a brake operation OFF state while the vehicle is traveling in the state where the lock-up clutch is engaged, in the case where the eco mode is selected, disengage the lock-up clutch when the vehicle speed decreases and reaches a third vehicle speed in a brake operation ON state while the vehicle is traveling in the state where the lock-up clutch is engaged, and set the third vehicle speed to a vehicle speed lower than the first vehicle speed, and set the second vehicle speed to a vehicle speed higher than the first vehicle speed.

8 Claims, 7 Drawing Sheets

(51) Int. Cl.
*B60W 10/11* (2012.01)
*F16H 61/14* (2006.01)
*B60W 30/18* (2012.01)

(52) U.S. Cl.
CPC ............ *B60W 10/06* (2013.01); *B60W 10/11* (2013.01); *B60W 30/18072* (2013.01); *F16H 61/14* (2013.01); *B60W 2510/0208* (2013.01); *B60W 2510/0233* (2013.01); *B60W 2520/10* (2013.01); *B60W 2540/10* (2013.01); *B60W 2540/12* (2013.01); *B60W 2710/024* (2013.01); *B60W 2710/0666* (2013.01); *B60W 2710/1005* (2013.01)

(58) Field of Classification Search
CPC ... B60W 2510/0208; B60W 2710/024; B60W 30/18072; B60W 2710/0666; B60W 2540/10; B60W 2540/12; B60W 2710/06; B60W 2710/1005; B60W 2520/10
USPC .......................................................... 477/77
See application file for complete search history.

CONTROL DEVICE AND CONTROL METHOD FOR VEHICLE, AND NON-TRANSITORY COMPUTER READABLE MEDIUM

TECHNICAL FIELD

The present invention relates to a control of a vehicle provided with a lock-up clutch.

BACKGROUND ART

There is known a control device for a vehicle including an engine in which a fuel cut control is performed to stop fuel supply when an engine rotation speed is equal to or higher than a predetermined engine rotation speed at the time of coasting, a transmission which receives a driving force of the engine via a fluid transmission device with a lock-up mechanism, and an auxiliary machine driven by the engine. JP2002-248935A discloses the following points: an auxiliary machine load is reduced in a low vehicle speed region during engagement of a lock-up mechanism at the time of coasting; a time for reducing the auxiliary machine load is limited, and after the limited time elapses, the lock-up mechanism is disengaged and the reduction of the auxiliary machine load is stopped; and further, before the limited time elapses, the lock-up mechanism is also disengaged and the reduction of the auxiliary machine load is stopped when the vehicle speed is equal to or lower than a predetermined lock-up disengagement vehicle speed.

SUMMARY OF INVENTION

However, in the related art described in JP2002-248935A, the control of disengaging the lock-up mechanism is performed when the vehicle speed is equal to or lower than a predetermined lock-up disengagement vehicle speed regardless of other conditions. Therefore, the lock-up disengagement vehicle speed may be inappropriate depending on a traveling scene, which may cause a strong deceleration feeling or deterioration of fuel efficiency.

The invention is made in view of the above-mentioned problem and demand, and an object of the invention is to solve the above-mentioned problem caused by the inappropriate lock-up disengagement vehicle speed.

To achieve the above object, according to an aspect of the present invention, a control device for a vehicle, includes a lock-up control unit configured to control engagement/disengagement of a lock-up clutch of a torque converter interposed between an engine and a stepped transmission mechanism; and a driving mode selection unit configured to select any one of a first driving mode and a second driving mode. The lock-up control unit is configured to, in a case where the first driving mode is selected, disengage the lock-up clutch when a vehicle speed decreases and reaches a first vehicle speed while the vehicle is traveling in a state where the lock-up clutch is engaged, in a case where the second driving mode is selected, disengage the lock-up clutch when the vehicle speed decreases and reaches a second vehicle speed in a brake operation OFF state while the vehicle is traveling in the state where the lock-up clutch is engaged, in the case where the second driving mode is selected, disengage the lock-up clutch when the vehicle speed decreases and reaches a third vehicle speed in a brake operation ON state while the vehicle is traveling in the state where the lock-up clutch is engaged, and set the third vehicle speed to a vehicle speed lower than the first vehicle speed, and set the second vehicle speed to a vehicle speed higher than the first vehicle speed.

According to the above aspect, since the above-mentioned means for solving the problem is adopted, in a deceleration scene in the second driving mode, both improvement in a running experience due to an idle running feeling during coasting deceleration traveling and improvement in the fuel efficiency during brake deceleration traveling can be achieved, as compared with a deceleration scene in the first driving mode.

DESCRIPTION OF EMBODIMENTS

Figure 1:
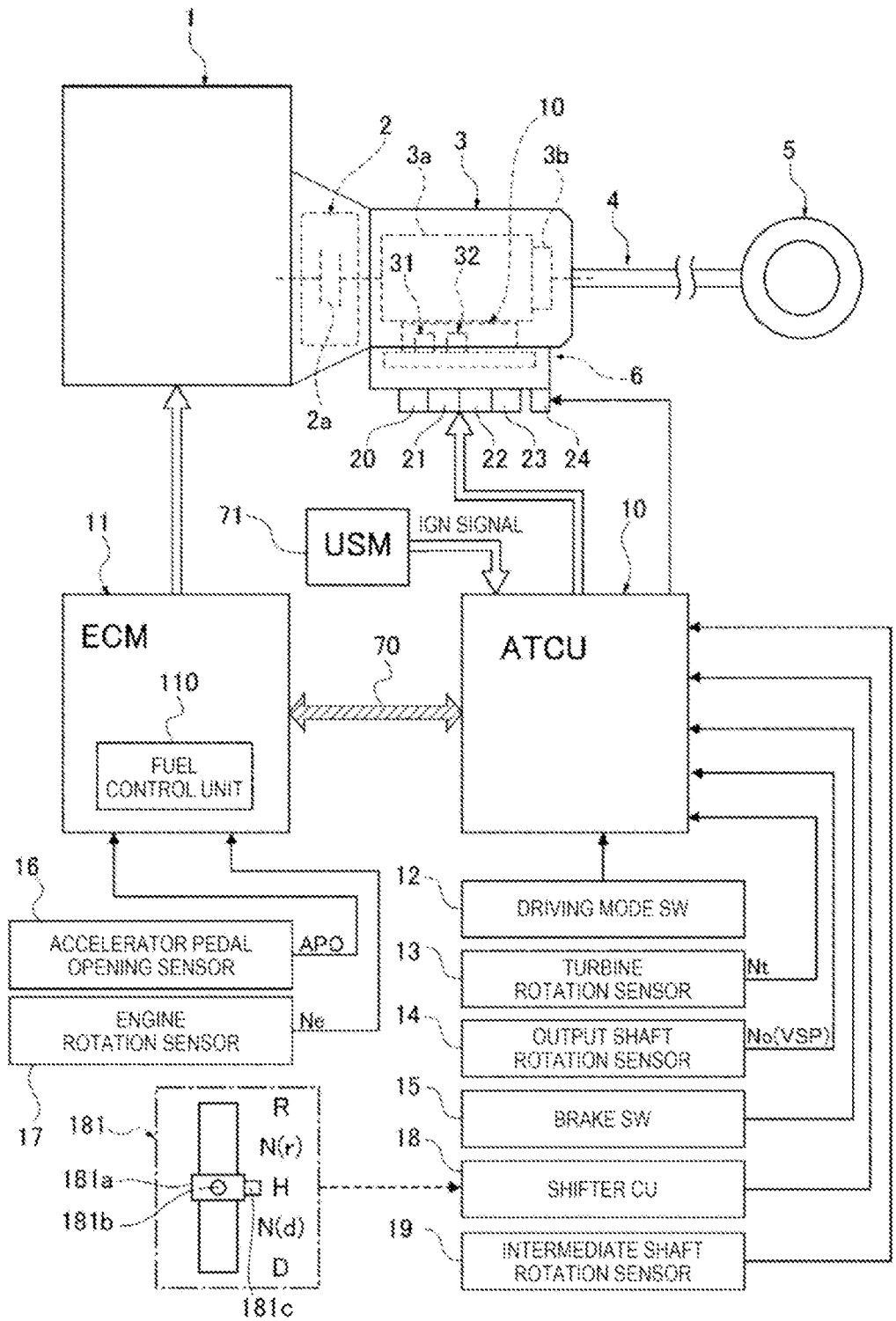
FIG. 1 is an overall system diagram showing an engine vehicle provided with an automatic transmission to which a control device of a first embodiment is applied.

Hereinafter, a control device for a vehicle according to an embodiment of the invention will be described with reference to the first embodiment shown in the drawings.

First Embodiment

A control device of a first embodiment is applied to an engine vehicle (an example of a vehicle) provided with an automatic transmission controlled by shift-by-wire and park-by-wire and having gear positions including nine forward speeds and one reverse speed. Hereinafter, a configuration of the first embodiment will be described separately as "Overall System Configuration", "Detailed Configuration of Automatic Transmission", "Detailed Configuration of Hydraulic Control System", and "Configuration of Lock-up Control Process".

[Overall System Configuration (FIG. 1)]

As shown in FIG. 1, a driving system of the engine vehicle includes an engine 1, a torque converter 2, an automatic transmission 3, a propeller shaft 4, and a driving wheel 5. The torque converter 2 is provided with a built-in lock-up clutch 2a that directly connects a crankshaft of the engine 1 and an input shaft IN of the automatic transmission 3 by engagement. The automatic transmission 3 is provided with a built-in gear train 3*a* and a built-in park gear 3*b*. A control valve unit 6 including spool valves, a hydraulic control circuit, solenoid valves, and the like for shifting is attached to the automatic transmission 3.

The control valve unit 6 includes, as the solenoid valves, six clutch solenoids 20 provided for friction elements, and one line pressure solenoid 21, one lubrication solenoid 22, and one lock-up solenoid 23. That is, a total of 9 solenoid valves are provided. Each of these solenoid valves has a three-way linear solenoid structure, and performs a pressure regulation operation in response to a control command from a transmission control unit 10.

As shown in FIG. 1, an electronic control system of the engine vehicle includes the transmission control unit 10 (abbreviated as "ATCU"), an engine control module 11 (abbreviated as "ECM"), and a CAN communication line 70. Here, the transmission control unit 10 is started or stopped according to an ignition signal from a sensor module unit 71 (abbreviated as "USM"). That is, the start or stop of the transmission control unit 10 is defined as a "wake-up or sleep control" in which a start variation increases as compared with a case where the start or stop is controlled by an ignition switch.

The transmission control unit 10 is mechanically and electrically integrally provided on an upper surface of the control valve unit 6, and includes, on a unit board thereof, a main board temperature sensor 31 and a sub board temperature sensor 32 by a redundant system while ensuring independence between the board temperature sensors. That is, the main board temperature sensor 31 and the sub board temperature sensor 32 transmit sensor value information to the transmission control unit 10, but unlike well-known automatic transmission units, temperature information that is obtained not in direct contact with a transmission fluid (ATF) in an oil pan is transmitted.

The transmission control unit 10 receives signals from a driving mode selection switch 12, a turbine rotation sensor 13, an output shaft rotation sensor 14, and a brake switch 15 in addition to those from the main board temperature sensor 31 and the sub board temperature sensor 32. Further, signals from a shifter control unit 18, an intermediate shaft rotation sensor 19, and the like are also input to the transmission control unit 10.

When an "eco-mode" is selected due to a switch operation of a driver via the driving mode selection switch 12, the vehicle travels in the "eco-mode" which is a driving mode in which fuel efficiency is emphasized as compared with a normal mode. When the switch is operated while the vehicle is traveling in the "eco-mode", the mode is switched to the "normal mode" in which a driving performance is emphasized as compared with the "eco-mode". The driver selects one of the "normal mode" emphasizing the driving performance and the "eco-mode" emphasizing the fuel efficiency by the switch operation. The turbine rotation sensor 13 detects a turbine rotation speed (=transmission input shaft rotation speed) of the torque converter 2 and transmits a signal indicating a turbine rotation speed Nt to the transmission control unit 10. The output shaft rotation sensor 14 detects an output shaft rotation speed of the automatic transmission 3 and transmits a signal indicating an output shaft rotation speed No (=vehicle speed VSP) to the transmission control unit 10. The brake switch 15 transmits, to the transmission control unit 10, a switch signal indicating whether a brake is operated to a brake operation ON state or a brake operation OFF state by a driver.

The shifter control unit 18 determines a range position selected by a driver performing a select operation on a shifter 181, and transmits a range position signal to the transmission control unit 10. The shifter 181 has a momentary structure, and includes a P range button 181*b* on an upper portion of an operation unit 181*a* and a lock release button 181*c* (only when N→R) on a side portion of the operation unit 181*a*. Further, range positions include an H range (home range), an R range (reverse range), a D range (drive range), and N(d) and N(r) (neutral ranges). The intermediate shaft rotation sensor 19 detects a rotation speed of an intermediate shaft (an intermediate shaft=a rotation member connected to a first carrier C1), and transmits a signal indicating an intermediate shaft rotation speed Nint to the transmission control unit 10.

The transmission control unit 10 monitors changes in an operating point (VSP, APO), that is related to a vehicle speed VSP and an accelerator pedal opening APO, on a shift map (see FIG. 4), so as to perform a shift control according to the following basic shift patterns:

1. Auto upshift (implemented by a vehicle speed increase in a state where an accelerator pedal opening is maintained)

2. Foot release upshift (implemented by an operation in which a foot leaves the accelerator pedal)

3. Foot ease upshift (implemented by an operation in which the accelerator pedal is eased up)

4. Power-on downshift (implemented by a vehicle speed decrease while the accelerator pedal opening is maintained)

5. Small opening sudden press downshift (implemented by pressing an accelerator pedal by a small operation amount)

6. Large opening sudden press downshift (implemented by pressing an accelerator pedal by a large operation amount: "kickdown")

7. Slow press downshift (implemented by pressing an accelerator pedal slowly and a vehicle speed increase)

8. Coast downshift (implemented by a vehicle speed decrease in an accelerator pedal release operation).

In this embodiment, a lock-up control and a fuel control of the engine 1 when "8. Coast downshift" is performed are handled.

Signals from an accelerator pedal opening sensor 16, an engine rotation sensor 17, and the like are input to the engine control module 11.

The accelerator pedal opening sensor 16 detects an accelerator pedal opening that is based on an accelerator pedal operation of the driver, and transmits a signal indicating an accelerator pedal opening APO to the engine control module 11. The engine rotation sensor 17 detects a rotation speed of the engine 1 and transmits a signal indicating an engine rotation speed Ne to the engine control module 11.

In addition to various controls on the engine itself, the engine control module 11 performs an engine torque limitation control and the like by a cooperative control with the transmission control unit 10. Since the engine control module 11 is connected to the transmission control unit 10 via the CAN communication line 70 such that information can be bidirectionally exchanged, when receiving an information request from the transmission control unit 10, the engine control module 11 outputs information on the accelerator pedal opening APO and the engine rotation speed Ne to the transmission control unit 10. Further, information on an engine torque Te and a turbine torque Tt that are obtained by estimation calculation is output to the transmission control unit 10. In addition, when receiving an upper limit torque-related engine torque limitation request from the transmission control unit 10, the engine control module 11 performs an engine torque limitation control in which the engine torque is limited by a predetermined upper limit torque.

The engine control module 11 includes a fuel control unit 110 that switches the engine among a fuel cut state in which fuel supply to the engine 1 is cut off, a torque up recovery state in which fuel supply to a part of cylinders (for example, half-cylinder, one or more and less than all cylinders) of the engine 1 is recovered, and a fuel cut recovery state in which fuel supply to all of the cylinders of the engine 1 is recovered. When an operation that the foot leaves the accelerator pedal is detected during traveling, the fuel control unit 110 sets a fuel cut state where the fuel supply to the engine 1 is cut off. Further, during deceleration in the fuel cut state, states are switched among the fuel cut, the torque up recovery, and the fuel cut recovery in response to a request from the transmission control unit 10. Hereinafter, the fuel cut is abbreviated as "F/C", the torque up recovery is abbreviated as "TUR", and the fuel cut recovery is abbreviated as "FCR". One or more and less than all cylinders is/are appropriately selected as the part of cylinders to which the fuel supply is recovered in the torque up recovery for recovering the fuel supply to the part of cylinders of the engine 1.

[Detailed Configuration of Automatic Transmission (FIGS. 2, 3, and 4)]

The automatic transmission 3 includes the gear train 3a (a stepped transmission mechanism) in which a plurality of gear positions can be set and a plurality of friction elements, and is characterized by the following points.

(a) A one-way clutch that mechanically engages/idles is not used as a shift element.

(b) Engagement/disengagement states of a first brake B1, a second brake B2, a third brake B3, a first clutch K1, a second clutch K2, and a third clutch K3, which are friction elements, are independently controlled by the clutch solenoids 20 at the time of a shift operation.

(c) During an in-gear state where an engaged state is maintained in an engagement pressure control of the friction elements, a maximum pressure command is not output to the clutch solenoids, but an intermediate pressure command corresponding to an element input torque capable of suppressing a clutch slippage is output to the clutch solenoids 20.

(d) The second clutch K2 and the third clutch K3 include centrifugal cancel chambers that offset a centrifugal pressure caused by a centrifugal force acting on a clutch piston oil chamber.

Figures 2, 3:
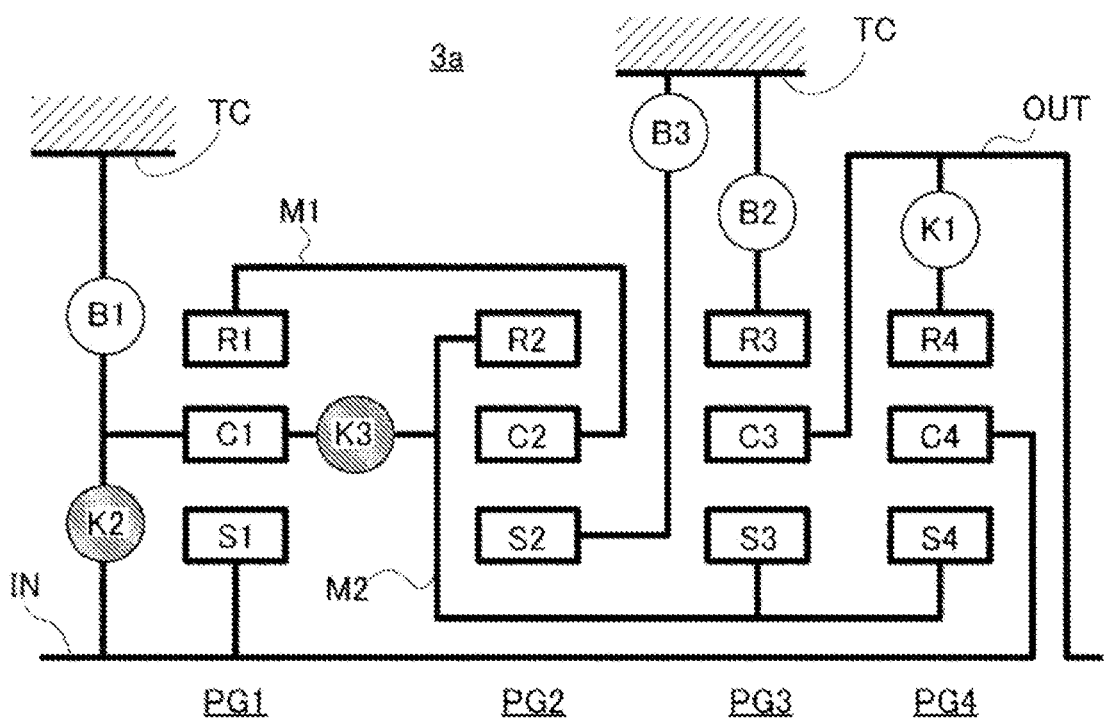
FIG. 2 is a skeleton diagram showing an example of a gear train of the automatic transmission.
FIG. 3 is an engagement table showing engaged states of shifting friction elements in the automatic transmission at each gear position.

As shown in FIG. 2, the automatic transmission 3 includes, as planetary gears constituting the gear train 3a, a first planetary gear PG1, a second planetary gear PG2, a third planetary gear PG3, and a fourth planetary gear PG4 in this order from the input shaft IN to an output shaft OUT.

The first planetary gear PG1 is a single pinion planetary gear, and includes a first sun gear S1, the first carrier C1 that supports pinions which mesh with the first sun gear S1, and a first ring gear R1 that meshes with the pinions.

The second planetary gear PG2 is a single pinion planetary gear, and includes a second sun gear S2, a second carrier C2 that supports pinions which mesh with the second sun gear S2, and a second ring gear R2 that meshes with the pinions.

The third planetary gear PG3 is a single pinion planetary gear, and includes a third sun gear S3, a third carrier C3 that supports pinions which mesh with the third sun gear S3, and a third ring gear R3 that meshes with the pinions.

The fourth planetary gear PG4 is a single pinion planetary gear, and includes a fourth sun gear S4, a fourth carrier C4 that supports pinions which mesh with the fourth sun gear S4, and a fourth ring gear R4 that meshes with the pinions.

As shown in FIG. 2, the automatic transmission 3 includes the input shaft IN, the output shaft OUT, a first connecting member M1, a second connecting member M2, and a transmission case TC. As the friction elements that are engaged or disengaged when shifting, the first brake B1, the second brake B2, the third brake B3, the first clutch K1, the second clutch K2, and the third clutch K3 are provided.

The input shaft IN is a shaft to which a driving force from the engine 1 is input via the torque converter 2, and is connected to the first sun gear S1 and the fourth carrier C4 all the time. Further, the input shaft IN is detachably connected to the first carrier C1 via the second clutch K2.

The output shaft OUT is a shaft that outputs a shifted drive torque to the driving wheel 5 via the propeller shaft 4, a final gear (not shown), and the like, and is connected to the third carrier C3 all the time. Further, the output shaft OUT is detachably connected to the fourth ring gear R4 via the first clutch K1.

The first connecting member M1 is a member that connects the first ring gear R1 of the first planetary gear PG1 and the second carrier C2 of the second planetary gear PG2 all the time with no friction element interposed therebetween. The second connecting member M2 is a member that connects the second ring gear R2 of the second planetary gear PG2, the third sun gear S3 of the third planetary gear PG3, and the fourth sun gear S4 of the fourth planetary gear PG4 all the time with no friction element interposed therebetween.

The first brake B1 is a friction element capable of locking rotation of the first carrier C1 with respect to the transmission case TC. The second brake B2 is a friction element capable of locking rotation of the third ring gear R3 with respect to the transmission case TC. The third brake B3 is a friction element capable of locking rotation of the second sun gear S2 with respect to the transmission case TC.

The first clutch K1 is a friction element that selectively connects the fourth ring gear R4 and the output shaft OUT. The second clutch K2 is a friction element that selectively connects the input shaft IN and the first carrier C1. The third clutch K3 is a friction element that selectively connects the first carrier C1 and the second connecting member M2.

A shift configuration in which each gear position is achieved will be described with reference to FIG. 3. A first-speed position (1st) is achieved by simultaneously engaging the second brake B2, the third brake B3, and the third clutch K3. A second speed position (2nd) is achieved by simultaneously engaging the second brake B2, the second clutch K2, and the third clutch K3. A third speed position (3rd) is achieved by simultaneously engaging the second brake B2, the third brake B3, and the second clutch K2. A fourth speed position (4th) is achieved by simultaneously engaging the second brake B2, the third brake B3, and the first clutch K1. A fifth speed position (5th) is achieved by simultaneously engaging the third brake B3, the first clutch K1, and the second clutch K2. The above-mentioned first to fifth speed positions are underdrive gear positions having a reduction gear ratio exceeding 1.

A sixth speed position (6th) is achieved by simultaneously engaging the first clutch K1, the second clutch K2, and the third clutch K3. This sixth speed position is a direct connection position having a gear ratio of 1.

A seventh speed position (7th) is achieved by simultaneously engaging the third brake B3, the first clutch K1, and the third clutch K3. An eighth speed position (8th) is achieved by simultaneously engaging the first brake B1, the first clutch K1, and the third clutch K3. A ninth speed position (9th) is achieved by simultaneously engaging the first brake B1, the third brake B3, and the first clutch K1. The above-mentioned seventh to ninth speed positions are overdrive gear positions having a speed increasing gear ratio of less than 1.

Further, when the gear position is upshifted or downshifted to an adjacent gear position among the gear positions of the first-speed position to the ninth speed position, as shown in FIG. 3, engagement of the friction elements is changed. That is, shifting to the adjacent gear position is achieved by maintaining engagement of two friction elements among three friction elements, disengaging one friction element, and engaging another friction element.

A reverse speed position (Rev) based on a selection of an R range position is achieved by simultaneously engaging the first brake B1, the second brake B2, and the third brake B3. When an N range position and a P range position are selected, basically all of the six friction elements B1, B2, B3, K1, K2, and K3 are disengaged.

Figure 4:
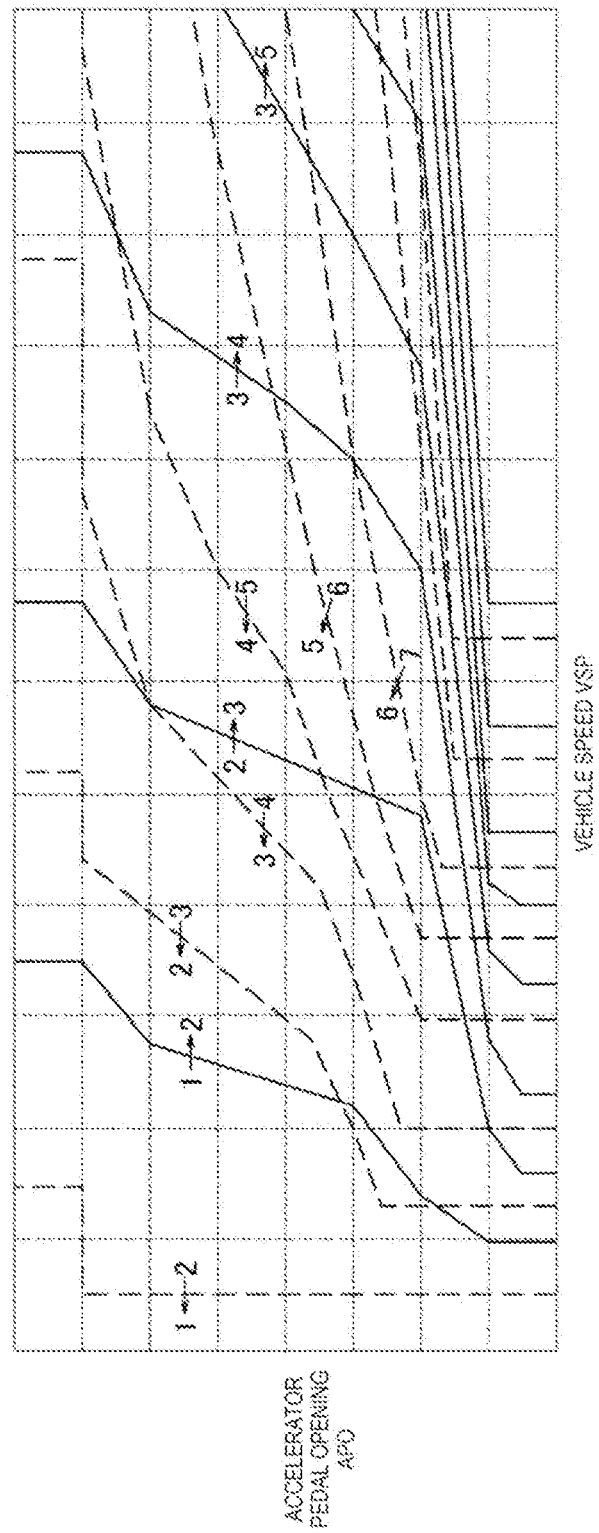
FIG. 4 is a shift map showing an example of a shift map in the automatic transmission.

Further, a shift map as shown in FIG. 4 is stored and set in the transmission control unit 10, and a shift by switching a gear position from the first-speed position to the ninth speed position on a forward side by a selection of the D range is performed according to this shift map. That is, when the operating point (VSP, APO) at that time crosses upshift lines shown by solid lines in FIG. 4, an upshifting request is issued. In addition, when the operating point (VSP, APO) crosses downshift lines shown by broken lines in FIG. 4, a downshifting request is issued.

[Detailed Configuration of Hydraulic Control System (FIGS. 5 to 7)]

Figure 5:
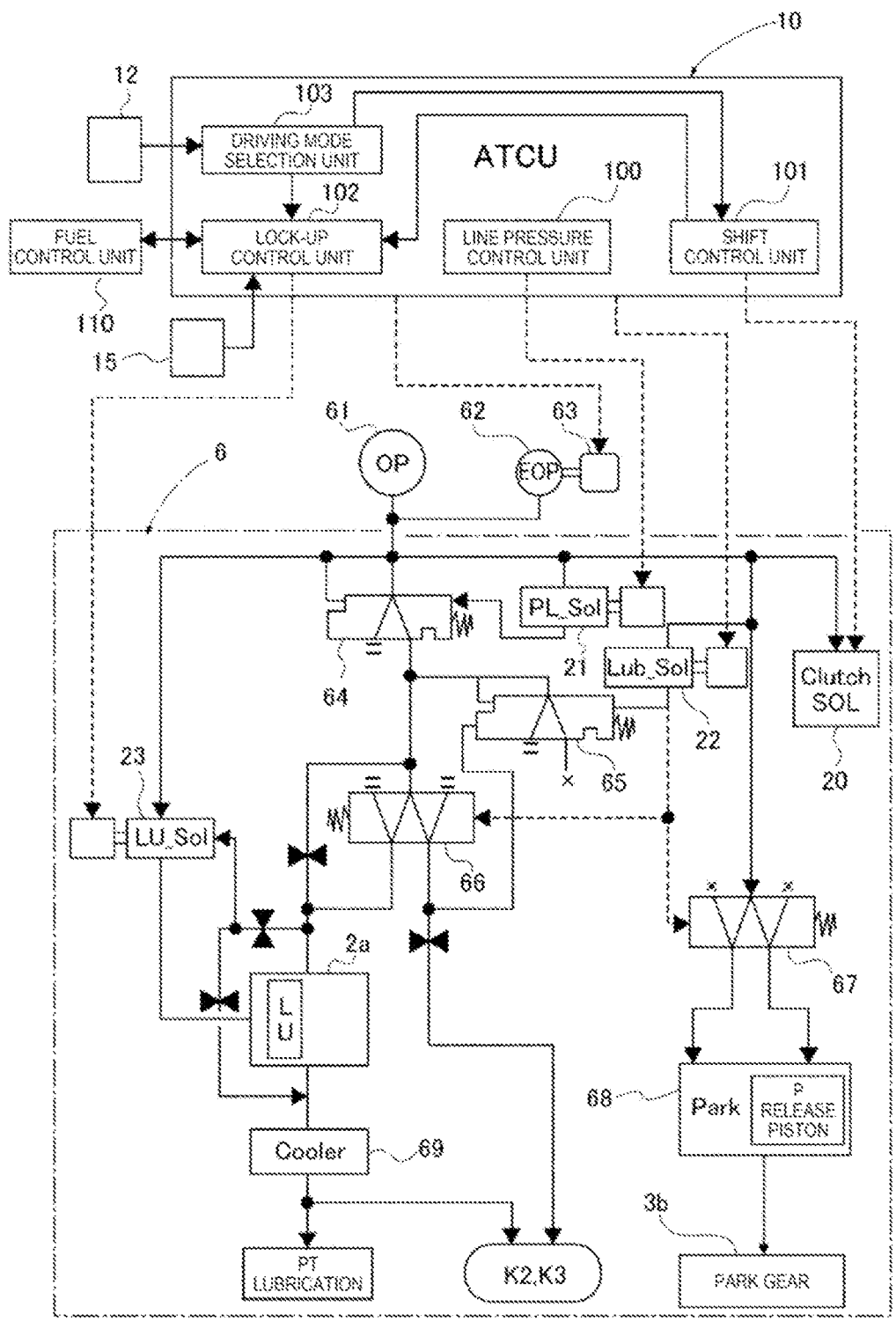
FIG. 5 is a hydraulic control system configuration diagram showing a control valve unit of the automatic transmission.

As shown in FIG. 5, the control valve unit 6 which is hydraulically controlled by the transmission control unit 10 includes, as hydraulic sources, a mechanical oil pump 61 and an electric oil pump 62. The mechanical oil pump 61 is pump-driven by the engine 1, and the electric oil pump 62 is pump-driven by an electric motor 63.

The control valve unit 6 includes, as valves provided in the hydraulic control circuit, the line pressure solenoid 21, a line pressure regulating valve 64, the clutch solenoid 20, and the lock-up solenoid 23. The control valve unit 6 further includes the lubrication solenoid 22, a lubrication pressure regulating valve 65, and a boost switching valve 66. The control valve unit 6 further includes a P-nP switching valve 67 and a park hydraulic actuator 68.

The line pressure regulating valve 64 regulates, based on a valve operation signal pressure from the line pressure solenoid 21, a pressure of oil, that is discharged from at least one of the mechanical oil pump 61 and the electric oil pump 62, to a line pressure PL.

The line pressure solenoid 21 regulates a pressure and is driven, according to a control command from a line pressure control unit 100 of the transmission control unit 10. As will be described later, as the intermediate pressure command is output to the clutch solenoid 20 in the in-gear state, the line pressure control unit 100 sets a target line pressure characteristic with respect to a magnitude of the input torque applied to the gear train 3a to a lower pressure side lower than a target line pressure characteristic in the case where the maximum pressure command is output to the clutch solenoid in the in-gear state.

The clutch solenoid 20 is a shift solenoid that uses the line pressure PL as an initial pressure and controls an engagement pressure and a disengagement pressure for each of the friction elements (B1, B2, B3, K1, K2, K3). Although only one clutch solenoid 20 is illustrated in FIG. 5, six solenoids are provided for the friction elements (B1, B2, B3, K1, K2, K3).

The clutch solenoid 20 regulates a pressure and is driven, according to a control command from a shift control unit 101 of the transmission control unit 10. The shift control unit 101 has an engagement pressure control function and a driving mode-corresponding shift control function. The engagement pressure control function refers to a function of outputting an intermediate pressure command corresponding to an element input torque capable of suppressing a clutch slippage to the clutch solenoid 20 instead of outputting a maximum pressure command to the clutch solenoid, during an in-gear state where an engaged state is maintained in an engagement pressure control of the friction elements. The driving mode-corresponding shift control function refers to a function of improving the fuel efficiency by changing a downshift request vehicle speed to a low vehicle speed side when a driving mode selection signal from a driving mode selection unit 103 is received and the eco-mode is selected, as compared with a case where the normal mode is selected. Specifically, when the normal mode is selected, a downshift control during a coasting deceleration is performed according to the normal mode shift map shown in FIG. 6, and when the eco-mode is selected, the downshift control during the coasting deceleration is performed according to the eco-mode shift map shown in FIG. 7. Therefore, in 4→3 coast downshift (abbreviated as "CD43") and 3→2 coast downshift (abbreviated as "CD32"), the downshift request vehicle speed when the eco-mode is selected is changed to a lower vehicle speed side as compared with when the normal mode is selected. In 5→4 coast downshift (abbreviated as "CD54") and 2→1 coast downshift (abbreviated as "CD21"), the downshift request vehicle speed is not changed.

The lock-up solenoid 23 controls a clutch differential pressure of the lock-up clutch 2a by using the line pressure PL and a pressure regulating excess oil that are generated by the line pressure regulating valve 64 when the lock-up clutch 2a is slip-engaged.

The lock-up solenoid 23 controls engagement (minute slip engagement) or disengagement of the lock-up clutch 2a according to a control command from a lock-up control unit 102 of the transmission control unit 10. The lock-up control unit 102 receives the driving mode selection signal from the driving mode selection unit 103, shift information from the shift control unit 101, fuel control information from the fuel control unit 110, brake operation information from the brake switch 15, and the like. Further, when the vehicle speed reaches the lock-up vehicle speed set in the low vehicle speed region immediately after the vehicle starts, a lock-up engagement control for maintaining the minute slip engagement of the lock-up clutch 2a is executed regardless of the driving mode, the gear position, or the gear shift. A lock-up disengagement control for disengaging the lock-up clutch 2a is divided into three patterns of "normal mode selected", "eco-mode selected/brake operation OFF", and "eco-mode selected/brake operation ON" depending on a mode selection and a brake operation during the coasting deceleration. That is, different lock-up disengagement vehicle speeds (a first vehicle speed, a second vehicle speed, and a third vehicle speed) are set for the respective three patterns, and the lock-up disengagement control for disengaging the lock-up clutch 2a is performed when the vehicle speed VSP decreases to the set lock-up disengagement vehicle speed. During the coasting deceleration, the lock-up control unit 102 outputs a command to the fuel control unit 110 to request cooperative control with the lock-up disengagement control.

The lubrication solenoid 22 has a function of generating a valve operation signal pressure to the lubrication pressure regulating valve 65 and a switching pressure to the boost switching valve 66, and adjusting a lubrication flow rate to be supplied to the friction elements to an appropriate flow rate for suppressing heat generation. The lubrication solenoid 22 is also a solenoid that mechanically guarantees a minimum lubrication flow rate for suppressing heat generation of the friction elements in a case other than a continuous shift protection, and that adjusts a lubrication flow rate added to the minimum lubrication flow rate.

The lubrication pressure regulating valve 65 can control a lubrication flow rate, that is to be supplied to a power train (PT) including the friction elements and the gear train 3a via a cooler 69, according to the valve operation signal pressure from the lubrication solenoid 22. Further, the lubrication pressure regulating valve 65 reduces frictions by optimizing the lubrication flow rate supplied to the PT.

The boost switching valve 66 increases, according to the switching pressure from the lubrication solenoid 22, an amount of oil supplied to the centrifugal cancel chambers of the second clutch K2 and the third clutch K3. This boost switching valve 66 is used to temporarily increase the amount of oil supplied in a scene where the amount of oil in the centrifugal cancel chambers is insufficient.

The P-nP switching valve 67 switches a line pressure path to the park hydraulic actuator 68 according to the switching pressure from the lubrication solenoid 22 (or a park solenoid). A parking lock in which the park gear 3b is meshed when the P range is selected and a parking lock cancellation in which meshing of the park gear 3b is canceled when a selected range is changed from the P range to a range other than the P range are performed.

In this way, the control valve unit 6 is configured to eliminate a manual valve mechanically connected to a shift lever to be operated by a driver for switching a D-range pressure oil path, an R-range pressure oil path, a P-range pressure oil path, and the like. When the D range, the R range, or the N range are selected by the shifter 181, the "shift-by-wire" is implemented by adopting a control in which the six friction elements are independently engaged or disengaged based on the range position signal from the shifter control unit 18. Further, when the P range is selected by the shifter 181, the "park-by-wire" is implemented by operating, based on the range position signal from the shifter control unit 18, the P-nP switching valve 67 and the park hydraulic actuator 68 that constitute a park module.

[Configuration of Lock-up Control Process (FIG. 8)]

Figure 8:
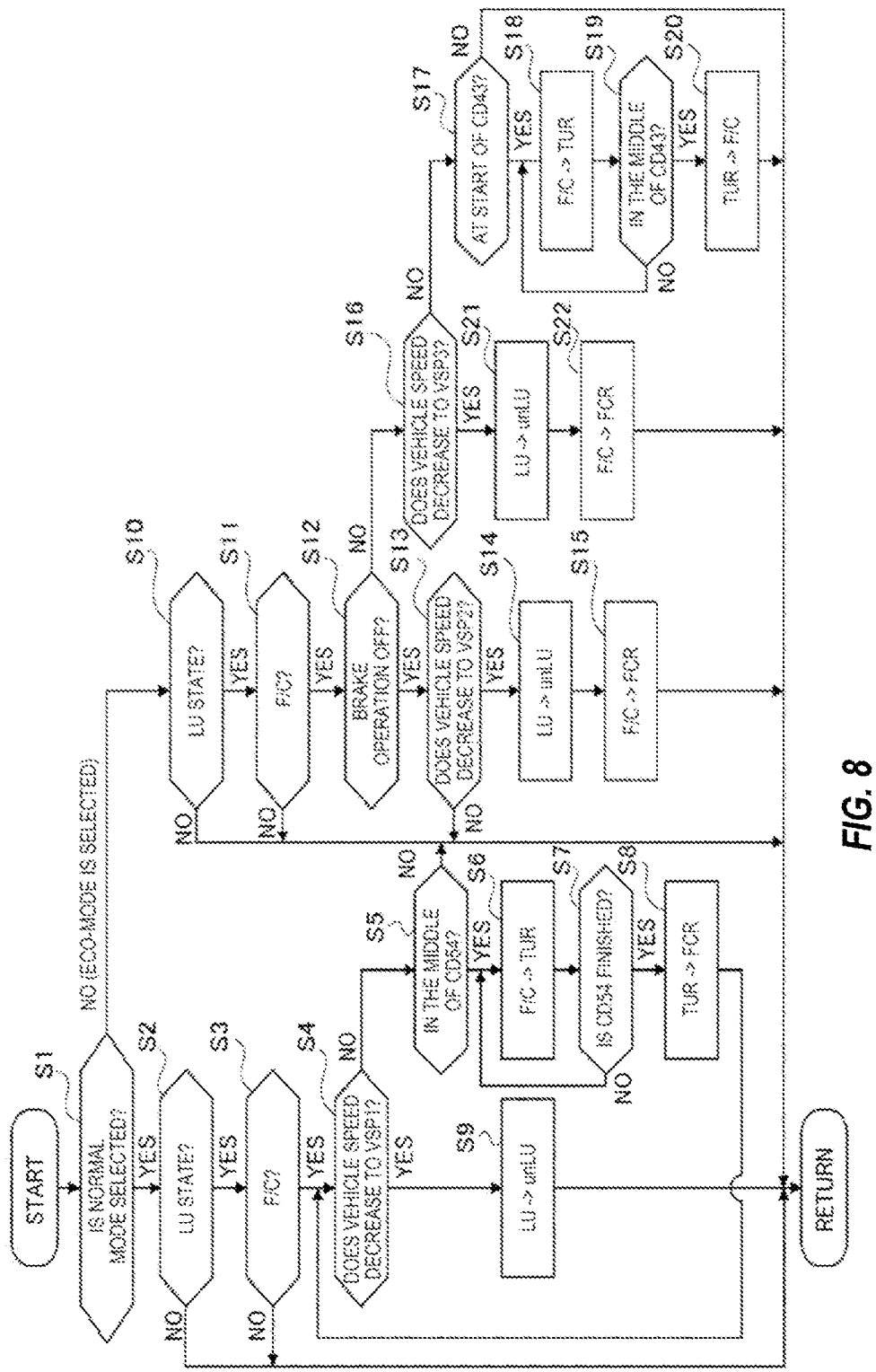
FIG. 8 is a flowchart showing a flow of a lock-up control process executed by a lock-up control unit of a transmission control unit.

FIG. 8 illustrates a flow of a lock-up control process executed by the lock-up control unit 102 of the transmission control unit 10. Hereinafter, each step of FIG. 8 will be described.

In step S1, after the process starts, it is determined whether the normal mode is selected as the driving mode. In a case of YES (the normal mode is selected), the process proceeds to step S2, and in a case of NO (the eco-mode is selected), the process proceeds to step S10.

In step S2, following the determination in S1 that the normal mode is selected, it is determined whether the lock-up clutch 2a is in the minute slip engagement state (LU state). In a case of YES (LU state), the process proceeds to step S3, and in a case of NO (unLU state), the process proceeds to RETURN.

In step S3, following the determination in S2 that the lock-up clutch 2a is in the LU state, it is determined whether the vehicle is in the fuel cut (F/C) state, where the fuel supply to the engine 1 is stopped, based on the operation that the foot leaves the accelerator pedal. In a case of YES (in the F/C state), the process proceeds to step S4, and in a case of NO (not in the F/C state), the process proceeds to RETURN.

In step S4, following the determination in S3 that the vehicle is in the F/C state, or a TUR→FCR shift process in S8, it is determined whether the vehicle speed VSP decreases to a first vehicle speed VSP1 due to the coasting deceleration. In a case of YES (the vehicle speed decreases to VSP1), the process proceeds to step S9, and in a case of NO (the vehicle speed does not decrease to VSP1), the process proceeds to step S5.

Figure 9:
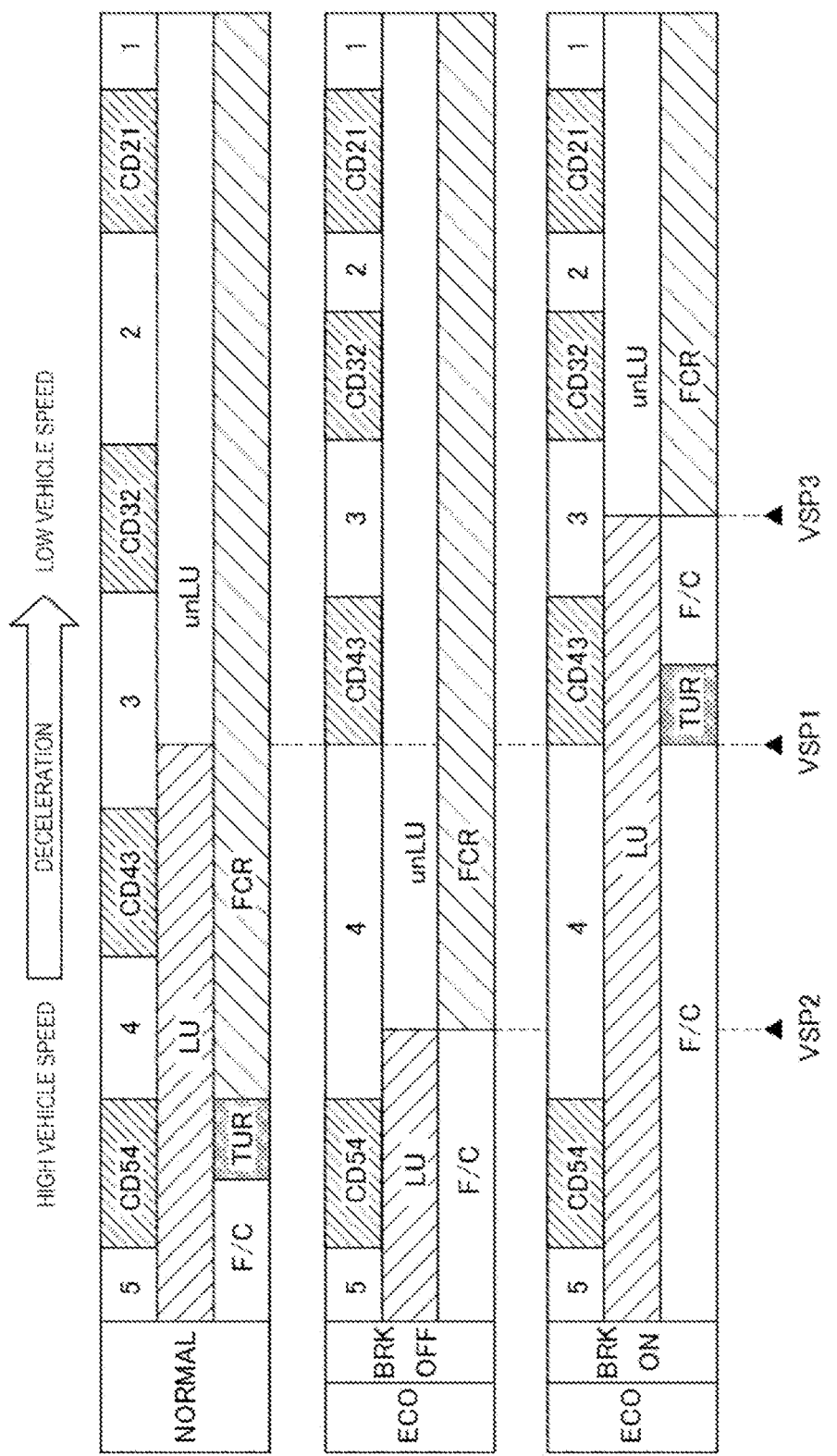
FIG. 9 is a control comparison diagram showing a mode-based comparison of the shift control, a lock-up control, and a fuel control in which a horizontal axis represents a vehicle speed that decreases in a normal mode, an eco-mode (brake operation OFF), and an eco-mode (brake operation ON).

Here, the "first vehicle speed VSP1" refers to a lock-up disengagement vehicle speed when the lock-up clutch 2a is disengaged in a normal mode selected state, and a relationship of a second vehicle speed VSP2>the first vehicle speed VSP1>a third vehicle speed VSP3 is established (see FIG. 9).

In step S5, following the determination in S4 that the vehicle speed VSP does not decrease to the first vehicle speed VSP1, it is determined whether the vehicle speed is in the middle of the 5→4 coast downshift (CD54). In a case of YES (in the middle of CD54), the process proceeds to step S6, and in a case of NO (not in the middle of CD54), the process proceeds to RETURN.

In step S6, following the determination in S5 that the vehicle speed is in the middle of CD54, or the determination in S7 that CD54 is not finished, a request for shifting the state from the fuel cut (F/C) state to the torque up recovery (TUR) state is output to the fuel control unit 110, and the process proceeds to step S7.

In step S7, following the process of shifting the state to the torque up recovery (TUR) state in S6, it is determined whether the 5→4 coast downshift (CD54) is finished. In a case of YES (CD54 is finished), the process proceeds to step S8, and in a case of NO (CD54 is not finished), the process returns to step S6.

In step S8, following the determination in S7 that CD54 is finished, a request for shifting the state from the torque up recovery (TUR) state to the fuel cut recovery (FCR) state is output to the fuel control unit 110, and the process returns to step S4.

In step S9, following the determination in S4 that the vehicle speed VSP decreases to the first vehicle speed VSP1, a command for shifting the lock-up clutch 2a from the minute slip engagement state (LU state) to a lock-up disengagement state (unLU state) is output to the lock-up solenoid 23, and the process proceeds to RETURN.

In step S10, following the determination in S1 that the eco-mode is selected, it is determined whether the lock-up clutch 2a is in the minute slip engagement state (LU state). In a case of YES (LU state), the process proceeds to step S11, and in a case of NO (unLU state), the process proceeds to RETURN.

In step S11, following the determination in S10 that the lock-up clutch 2a is in the LU state, it is determined whether the engine is in the fuel cut (F/C) state, where the fuel supply to the engine 1 is stopped, based on the operation that the foot leaves the accelerator pedal. In a case of YES (in the F/C state), the process proceeds to step S12, and in a case of NO (not in the F/C state), the process proceeds to RETURN.

In step S12, following the determination in S1 that the engine is in the F/C state, it is determined whether the brake is in the brake operation OFF state. In a case of YES (brake operation OFF), the process proceeds to step S13, and in a case of NO (brake operation ON), the process proceeds to step S16. In addition, whether the brake is in the brake operation OFF state or the brake operation ON state is determined based on the switch signal from the brake switch 15.

In step S13, following the determination in S12 that the brake is in the brake operation OFF state, it is determined whether the vehicle speed VSP decreases to the second vehicle speed VSP2 due to the coasting deceleration. In a case of YES (the vehicle speed decreases to VSP2), the process proceeds to step S14, and in a case of NO (the vehicle speed does not decrease to VSP2), the process proceeds to RETURN.

Here, the "second vehicle speed VSP2" refers to a lock-up disengagement vehicle speed when the lock-up clutch 2a is disengaged in an eco-mode selected state and a brake operation OFF state, and a relationship of the second vehicle speed VSP2>the first vehicle speed VSP1>the third vehicle speed VSP3 is established (see FIG. 9).

In step S14, following the determination in S13 that the vehicle speed VSP decreases to the second vehicle speed VSP2, a command for shifting the lock-up clutch 2a from the minute slip engagement state (LU state) to the lock-up disengagement state (unLU state) is output to the lock-up solenoid 23, and the process proceeds to step S15.

In step S15, following the LU→unLU shift process in S14, a request for shifting the state from the fuel cut (F/C) state to the fuel cut recovery (FCR) state is output to the fuel control unit 110, and the process proceeds to RETURN.

In step S16, following the determination in S12 that the brake is in the brake operation ON state, it is determined whether the vehicle speed VSP decreases to the third vehicle speed VSP3 due to the brake deceleration. In a case of YES (the vehicle speed decreases to VSP3), the process proceeds to step S21, and in a case of NO (the vehicle speed does not decrease to VSP3), the process proceeds to step S17.

Here, the "third vehicle speed VSP3" refers to a lock-up disengagement vehicle speed when the lock-up clutch 2a is disengaged in an eco-mode selected state and a brake operation ON state, and a relationship of the second vehicle speed VSP2>the first vehicle speed VSP1>the third vehicle speed VSP3 is established (see FIG. 9).

In step S17, following the determination in S16 that the vehicle speed VSP does not decrease to the third vehicle speed VSP3, it is determined whether the vehicle speed is at the start of the 4→3 coast downshift (CD43). In a case of YES (at the start of CD43), the process proceeds to step S18, and in a case of NO (not at the start of CD43), the process proceeds to RETURN.

In step S18, following the determination in S17 that the vehicle speed is at the start of CD43, or the determination in S19 that the vehicle speed does not reach the middle of CD43, a request for shifting the state from the fuel cut (F/C) state to the torque up recovery (TUR) state is output to the fuel control unit 110, and the process proceeds to step S19.

In step S19, following the process of shifting the state to the torque up recovery (TUR) state in S18, it is determined whether the vehicle speed reaches the middle of the 4→3 coast downshift (CD43). In a case of YES (the vehicle speed reaches the middle of CD43), the process proceeds to step S20, and in a case of NO (the vehicle speed does not reach the middle of CD43), the process returns to step S18.

In step S20, following the determination in S19 that the vehicle speed reaches the middle of CD43, a request for shifting the state from the torque up recovery (TUR) state to the fuel cut recovery (FCR) state is output to the fuel control unit 110, and the process proceeds to RETURN.

In step S21, following the determination in S16 that the vehicle speed VSP decreases to the third vehicle speed VSP3, a command for shifting the lock-up clutch 2a from the minute slip engagement state (LU state) to the lock-up disengagement state (unLU state) is output to the lock-up solenoid 23, and the process proceeds to step S22.

In step S22, following the LU→unLU shift process in S21, a request for shifting the state from the fuel cut (F/C) state to the fuel cut recovery (FCR) state is output to the fuel control unit 110, and the process proceeds to RETURN.

Next, "Problems to be Solved and Solution to Problems" will be described. Further, an operation of the first embodiment will be described separately as "Operation of Lock-up Control Process" and "Operation of Lock-up Control".

Problems to be Solved and Solution to Problems

As a background art of disengaging a lock-up clutch when a vehicle speed decreases to a lock-up disengagement vehicle speed during a coasting deceleration, a control is performed such that one set lock-up disengagement vehicle speed is not changed regardless of a selected driving mode.

Therefore, according to the background art, during the coasting deceleration, even though an eco-mode emphasizing the fuel efficiency is selected as the driving mode, the lock-up clutch is disengaged when the vehicle speed decreases to the same vehicle speed as when the normal mode is selected. Then, when the lock-up clutch is disengaged, the engine is disconnected from a driving wheel, and the engine cannot be rotated by the driving wheel. Therefore, there is a problem that it is necessary to maintain a self-sustaining rotation of the engine by supplying fuel to the engine, whose fuel is cut off, until a disengagement timing of the lock-up clutch is reached at the latest, and improvement in fuel efficiency cannot be expected.

Therefore, in view of the improvement in fuel efficiency when the eco-mode is selected, a solution is provided to set the lock-up disengagement vehicle speed at the time when the eco-mode is selected to a lower vehicle speed side as compared with the normal mode emphasizing the driving performance is selected. However, when the lock-up disengagement vehicle speed is set to the low vehicle speed side during the coasting deceleration that does not involve a brake operation when the eco-mode is selected, an engine brake deceleration feeling due to the lock-up engagement state being maintained up to the low vehicle speed region is strong. That is, when the lock-up disengagement vehicle speed is uniformly reduced when the eco-mode is selected, an idle running feeling with a slow deceleration desired by the driver maintained is not obtained during the coasting deceleration that does not involve a brake operation.

As a result of verifying solutions to the above-mentioned problem and demand, the present inventors have focused on the following points.

(A) When a lock-up disengagement vehicle speed is set separately for a first driving mode (a normal mode) and a second driving mode (an eco-mode), an intention of the driver on selection of driving modes can be reflected in a lock-up disengagement control.

(B) In a case where the second driving mode (the eco-mode) is selected, when the lock-up disengagement vehicle speed is set separately for a brake operation OFF state and a brake operation ON state, a driving performance request and a fuel efficiency request related to operations of the driver can be reflected in the lock-up disengagement control.

Based on the above-mentioned focused point, the following means to solve the problems will be adopted. The control device for a vehicle according to the present disclosure includes the lock-up clutch 2a of the torque converter 2 interposed between the engine 1 and the gear train 3a, the lock-up control unit 102 configured to control engagement/disengagement of the lock-up clutch 2a, and the driving mode selection unit 103 configured to select one of the first driving mode and the second driving mode. The lock-up control unit 102 is configured to: in a case where the first driving mode is selected, disengage the lock-up clutch 2a when the vehicle speed VSP decreases and reaches the first vehicle speed VSP1 while the vehicle is traveling in a state where the lock-up clutch 2a is engaged; in a case where the second driving mode is selected, disengage the lock-up clutch 2a when the vehicle speed VSP decreases and reaches the second vehicle speed VSP2 in the brake operation OFF state while the vehicle is traveling in the state where the lock-up clutch 2a is engaged; and in the case where the second driving mode is selected, disengage the lock-up clutch 2a when the vehicle speed VSP decreases and reaches the third vehicle speed VSP3 in the brake operation ON state while the vehicle is traveling in the state where the lock-up clutch 2a is engaged; and set the third vehicle speed VSP3 to a vehicle speed lower than the first vehicle speed VSP1, and set the second vehicle speed VSP2 to a vehicle speed higher than the first vehicle speed VSP1.

That is, in a case where the second driving mode is selected, when the vehicle speed VSP decreases in the brake operation OFF state while the vehicle is traveling in the state where the lock-up clutch 2a is engaged and reaches the second vehicle speed VSP2 which is set to a vehicle speed higher than the first vehicle speed VSP1, the lock-up clutch 2a is disengaged. Therefore, in the second driving mode, during the coasting deceleration traveling in the brake operation OFF state, the lock-up clutch 2a is disengaged earlier than during coasting deceleration traveling in the first driving mode. That is, the vehicle is shifted to sailing traveling in a neutral state due to the disengagement of the lock-up clutch 2a, and good running experience is obtained due to an idle running feeling in the sailing traveling.

That is, in a case where the second driving mode is selected, when the vehicle speed VSP decreases in the brake operation ON state while the vehicle is traveling in the state where the lock-up clutch 2a is engaged and reaches the third vehicle speed VSP3 which is set to a vehicle speed lower than the first vehicle speed VSP1, the lock-up clutch 2a is disengaged. Therefore, during the brake deceleration traveling in the brake operation ON state in the second driving mode, the disengagement of the lock-up clutch 2a is delayed as compared with a case during the brake deceleration traveling in the first driving mode, and accordingly, the fuel cut recovery of the engine 1 is also delayed. That is, a fuel cut section of the engine 1 in the brake deceleration traveling becomes long, and fuel consumption of the engine 1 is reduced as compared with a case during the brake deceleration traveling in the first driving mode.

In this way, when the second driving mode is selected, since different lock-up disengagement vehicle speeds (the second vehicle speed VSP2 and the third vehicle speed VSP3) are set separately for the brake operation OFF state and the brake operation ON state, the driving performance request and the fuel efficiency request are reflected in the lock-up disengagement control. As a result, in the deceleration scene in the second driving mode, both improvement in the running experience due to the idle running feeling during the coasting deceleration traveling and improvement in the fuel efficiency during the brake deceleration traveling can be achieved, as compared with the deceleration scene in the first driving mode. Here, when the first driving mode is set to the normal mode and the second driving mode is set to the eco-mode, in the deceleration scene in the eco-mode, the driving performance request and the fuel efficiency request depending on presence or absence of brake operations of the driver are reflected, and both improvement in the running experience due to the idle running feeling during the coasting deceleration traveling and improvement in the fuel efficiency during the brake deceleration traveling can be achieved.

[Operation of Lock-up Control Process (FIG. 8)]

Operations of the lock-up control process in states of A. Normal mode selected, B. Eco-mode selected (brake operation OFF), and C. Eco-mode selected (brake operation ON) will be described below with reference to FIG. 8.

A. Normal Mode Selected

In a case where the normal mode is selected, when the lock-up clutch is in the minute slip engagement state (LU state) and the engine is in the fuel cut (F/C) state, the process proceeds to S1→S2→S3→S4. In S4, it is determined whether the vehicle speed VSP decreases to the first vehicle speed VSP1 due to the coasting deceleration. Further, when the vehicle speed VSP does not decrease to the first vehicle speed VSP1, the process proceeds from S4 to S5. In S5, it is determined whether the vehicle speed is in the middle of the 5→4 coast downshift. When the vehicle speed VSP does not decrease to a vehicle speed in the middle of the 5→4 coast downshift, the process proceeds from S5 to RETURN, and the minute slip engagement state (LU state) and the fuel cut (F/C) state are maintained.

On the other hand, when the vehicle speed VSP decreases to a vehicle speed in the middle of the 5→4 coast downshift, the process proceeds from S5 to S6→S7, and a flow of S6→S7 is repeated until it is determined in S7 that the 5→4 coast downshift is finished. In S6, a request for shifting the state from the fuel cut (F/C) state to the torque up recovery (TUR) state is output to the fuel control unit 110. When it is determined in S7 that the 5→4 coast downshift is finished, the process proceeds from S7 to S8→S4. In S8, a request for shifting the state from the torque up recovery (TUR) state to the fuel cut recovery (FCR) state is output to the fuel control unit 110.

When it is determined in S4 that the vehicle speed VSP decreases to the first vehicle speed VSP1 after the state is shifted to the fuel cut recovery (FCR) state, the process proceeds from S4 to S9→RETURN. In S9, a command for shifting the lock-up clutch 2a from the minute slip engagement state (LU state) to the lock-up disengagement state (unLU state) is output to the lock-up solenoid 23.

B. Eco-Mode Selected (Brake Operation OFF)

Next, in a case where the eco-mode is selected, when the lock-up clutch is in the minute slip engagement state (LU state), the engine is in the fuel cut (F/C) state and the brake is in the brake operation OFF state, the process proceeds to S1→S10→S11→S12→S13. In S12, it is determined whether the brake is in the brake operation OFF state. In S13, it is determined whether the vehicle speed VSP decreases to the second vehicle speed VSP2 due to the coasting deceleration in the brake operation OFF state. While the vehicle speed VSP does not decrease to the second vehicle speed VSP2 due to the coasting deceleration, the process proceeds from S13 to RETURN, and the minute slip engagement state (LU state) and the fuel cut (F/C) state are maintained.

On the other hand, when it is determined in S13 that the vehicle speed VSP decreases to the second vehicle speed VSP2 due to the coasting deceleration in the brake operation OFF state, the process proceeds from S13 to S14→S15→RETURN. In S14, a command for shifting the lock-up clutch 2a from the minute slip engagement state (LU state) to the lock-up disengagement state (unLU state) is output to the lock-up solenoid 23. In the following S15, a request for shifting the state from the fuel cut (F/C) state to the fuel cut recovery (FCR) state is output to the fuel control unit 110.

C. Eco-Mode Selected (Brake Operation ON)

Next, in a case where the eco-mode is selected, when the lock-up clutch is in the minute slip engagement state (LU state), the engine is in the fuel cut (F/C) state and the brake is in the brake operation ON state, the process proceeds to S1→S10→S11→S12→S16. In S16, it is determined whether the vehicle speed VSP decreases to the third vehicle speed VSP3 due to the brake deceleration. Further, when the vehicle speed VSP does not decrease to the third vehicle speed VSP3, the process proceeds from S16 to S17. In S17, it is determined whether the vehicle speed is at the start of the 4→3 coast downshift. When the vehicle speed VSP does not decrease to a vehicle speed for starting the 4→3 coast downshift, the process proceeds from S17 to RETURN, and the minute slip engagement state (LU state) and the fuel cut (F/C) state are maintained.

When the vehicle speed VSP decreases to a vehicle speed for starting the 4→3 coast downshift, the process proceeds from S17 to S18→S19, and a flow of S18→S19 is repeated until it is determined in S19 that the vehicle speed is in the middle of the 4→3 coast downshift. In S18, a request for shifting the state from the fuel cut (F/C) state to the torque up recovery (TUR) state is output to the fuel control unit 110. When it is determined in S19 that the vehicle speed is in the middle of the 4→3 coast downshift, the process proceeds from S19 to S20. In S20, a request for shifting the state from the torque up recovery (TUR) state to the fuel cut (F/C) state is output to the fuel control unit 110.

On the other hand, when it is determined in S16 that the vehicle speed VSP decreases to the third vehicle speed VSP3 due to brake deceleration based on a brake operation, the process proceeds from S16 to S2→S22→RETURN. In S21, a command for shifting the lock-up clutch 2a from the minute slip engagement state (LU state) to the lock-up disengagement state (unLU state) is output to the lock-up solenoid 23. In the following S22, a request for shifting the state from the fuel cut (F/C) state to the fuel cut recovery (FCR) state is output to the fuel control unit 110.

[Operation of Lock-up Control (FIG. 9)]

Operations of the lock-up control in A. Normal mode selected state, B. Eco-mode selected state (brake operation OFF state), and C. Eco-mode selected state (brake operation ON state) will be described below with reference to FIG. 9.

A. Normal Mode Selected State (an upper part in FIG. 9)

Figure 6:
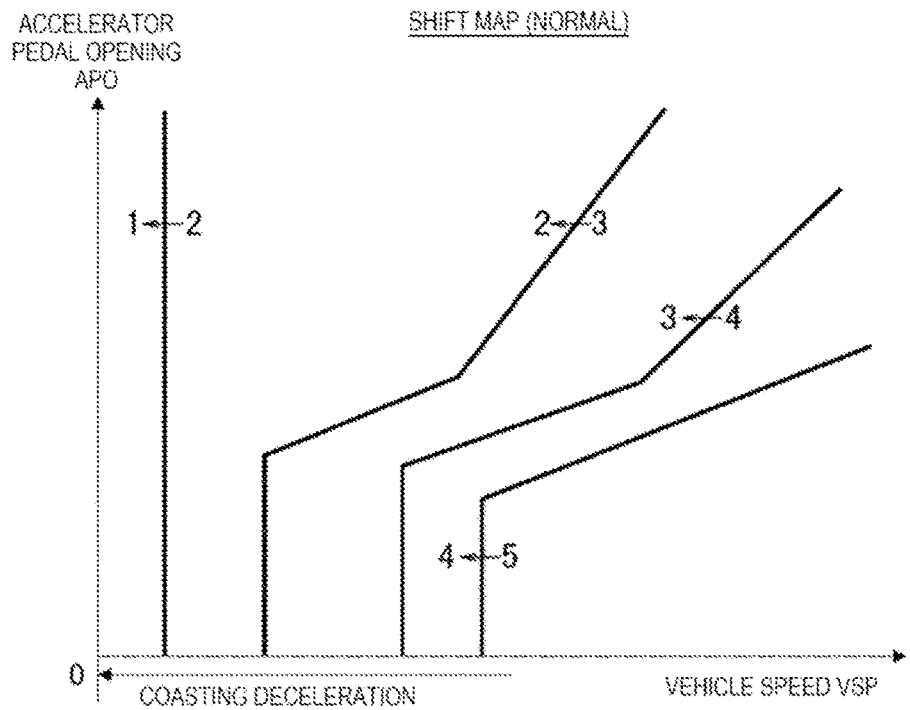
FIG. 6 is a normal mode shift map showing downshift lines in a low speed and low opening region adopted in a shift control when a normal mode is selected.

The shift control when the normal mode is selected is performed according to the shift map (NORMAL) shown in FIG. 6. That is, as the vehicle speed VSP decreases due to the deceleration (including deceleration in brake operation ON and OFF states), the 5→4 coast downshift (CD54), the 4→3 coast downshift (CD43), the 3→2 coast downshift (CD32), and the 2→1 coast downshift (CD21) is executed.

In a lock-up control when the normal mode is selected, the lock-up clutch 2a is disengaged when the vehicle speed VSP decreases and reaches the first vehicle speed VSP1 during traveling in a state where the lock-up clutch 2a is engaged (LU state). The timing to disengage the lock-up clutch 2a is when the gear train 3a is in the in-gear state at the third speed position.

In a fuel control when the normal mode is selected, during the coasting deceleration in the fuel cut (F/C) state, when a request of the 5→4 coast downshift in which a vehicle speed is at a higher vehicle speed side higher than the first vehicle speed VSP1 is issued, a control for shifting the state from the fuel cut state to the torque up recovery (TUR) state during the 5→4 coast downshift is performed. Further, when the 5→4 coast downshift is finished, a control for shifting the state from the torque up recovery (TUR) state to the fuel cut recovery (FCR) state is performed.

In this way, in the lock-up control when the normal mode is selected, the first vehicle speed VSP1, which is the lock-up disengagement vehicle speed, is set to a vehicle speed at which the fuel efficiency is ensured as much as possible while emphasizing the driving performance. That is, since the first vehicle speed VSP1 is set in consideration of a balance between the driving performance and the fuel efficiency when the normal mode is selected, the first vehicle speed VSP1 can be used as a reference value of the lock-up disengagement vehicle speed when the eco-mode is selected.

In the fuel control when the normal mode is selected, by shifting the state from the fuel cut (F/C) state to the torque up recovery (TUR) state during the 5→4 coast downshift, shift responsiveness of the 5→4 coast downshift is improved. That is, the downshift is shift that increases the transmission input shaft rotation speed, and by supplying fuel to a part of the cylinders of the engine 1, an increase in the transmission input shaft rotation speed is promoted by the engine 1, and thus a shift progress speed of the 5→4 coast downshift can be increased while suppressing an uncomfortable feeling in the shift. The reason for shifting the state to the torque up recovery (TUR) state is that, when the state is shifted to the fuel cut recovery (FCR) state during the 5→4 coast downshift, the input torque applied to the gear train 3a suddenly changes from a coast torque, which may cause a shift shock.

In the fuel control when the normal mode is selected, when the 5→4 coast downshift is finished, the state is shifted from the torque up recovery (TUR) state to the fuel cut recovery (FCR) state. That is, the shift to the fuel cut recovery (FCR) state is generally performed at the timing of disengaging the lock-up clutch 2a. However, when the normal mode is selected, there are many scenes in which an accelerator pedal depression operation is performed during a coasting deceleration implemented by an operation, in which the foot leaves the accelerator pedal, to request a re-acceleration. On the other hand, in a case where the re-acceleration is requested when the state is already shifted from the torque up recovery (TUR) state to the fuel cut recovery (FCR) state at the timing of the lock-up state, it is possible to respond to the re-acceleration request with good responsiveness. That is, after the re-acceleration request, the speed of the engine 1 is raised with good responsiveness to the accelerator pedal depression operation without the necessity of shifting the state to the fuel cut recovery (FCR) state.

B. Eco-Mode Selected State/Brake Operation OFF State (a middle part in FIG. 9)

Figure 7:
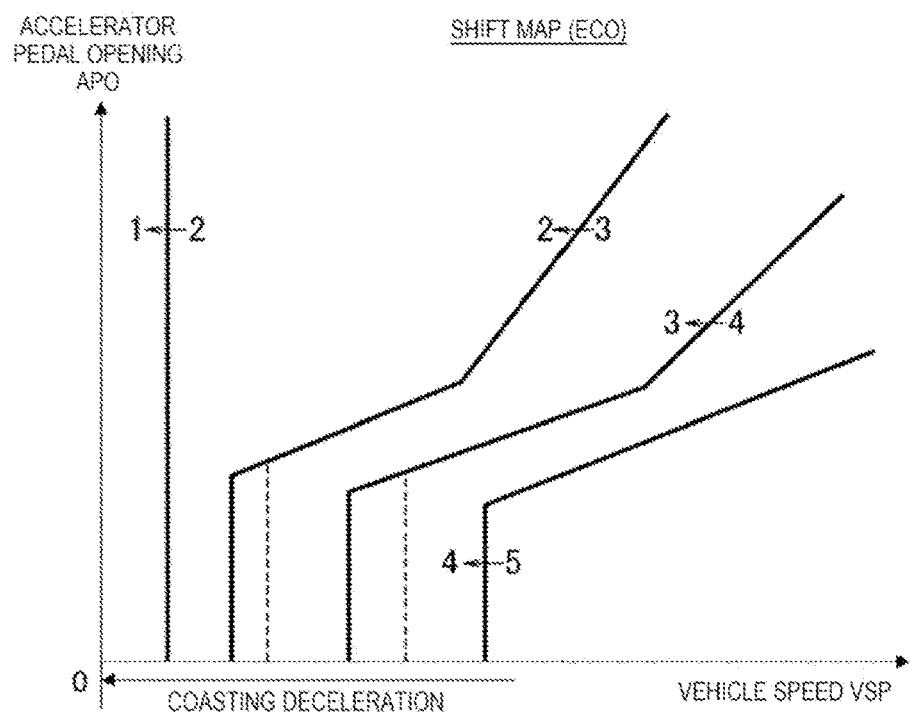
FIG. 7 is an eco-mode shift map showing downshift lines in a low speed and low opening region adopted in a shift control when an eco-mode is selected.

The shift control when the eco-mode is selected is performed according to the shift map (ECO) shown in FIG. 7. That is, as the vehicle speed VSP decreases due to the deceleration (including deceleration in brake operation ON and OFF states), the 5→4 coast downshift (CD54), the 4→3 coast downshift (CD43), the 3→2 coast downshift (CD32), and the 2→1 coast downshift (CD21) is executed. In this case, the start timings of the 4→3 coast downshift and the 3→2 coast downshift are later (at the lower vehicle speed side) than that when the normal mode is selected.

In the lock-up control when the eco-mode is selected, when the vehicle speed VSP decreases in the brake operation OFF state while the vehicle is traveling in the state where the lock-up clutch 2a is engaged (LU state) and reaches the second vehicle speed VSP2 which is set to a vehicle speed higher than the first vehicle speed VSP1, the lock-up clutch 2a is disengaged. The timing to disengage the lock-up clutch 2a is when the gear train 3a is in the in-gear state at the fourth speed position. Therefore, during the coasting deceleration, when the vehicle speed reaches the second vehicle speed VSP2 at a timing earlier than the timing when the normal mode is selected, an idle running state (a sailing traveling state) in which the lock-up clutch 2a is disengaged is started, and the running experience for occupants including the driver is improved in a long coasting deceleration section after the second vehicle speed VSP2 is reached.

In the fuel control when the eco-mode is selected, during the coasting deceleration in a fuel cut state and a brake operation OFF state, the state is not shifted to the torque up recovery state even when an request of the 5→4 coast downshift in which the vehicle speed is at a higher vehicle speed side higher than the second vehicle speed VSP2 is issued. That is, in a traveling scene in which sensitivity of the driver to a front-rear acceleration fluctuation of the vehicle is high during the coasting deceleration implemented by the accelerator pedal/brake release operation, when the state is shifted to the torque up recovery state during the 5→4 coast downshift, fluctuation of a transmission input torque occurs even though being small. Therefore, by not shifting the state to the torque up recovery state even when the 5→4 coast downshift is requested, an uncomfortable feeling of the driver is prevented during the coasting deceleration in a fuel cut state and a brake operation OFF state.

In the fuel control when the eco-mode is selected, when the vehicle speed reaches the second vehicle speed VSP2, the state is shifted from the fuel cut (F/C) state to the fuel cut recovery (FCR) state. That is, the second vehicle speed VSP2 is a vehicle speed at which the lock-up clutch 2a is shifted from the LU state to the unLU state. Therefore, in order to ensure a self-sustaining operation of the engine 1 disconnected from the driving wheel 5, it is necessary to shift the state to the fuel cut recovery (FCR) state at the timing of shifting the lock-up clutch 2a to the unLU state.

C. Eco-Mode Selected State/Brake Operation ON State (a lower part in FIG. 9)

The shift control when the eco-mode is selected is performed in the same manner as in the case of eco-mode selected state and brake operation OFF state according to the shift map (ECO) shown in FIG. 7.

In the lock-up control when the eco-mode is selected, when the vehicle speed VSP decreases in the brake operation ON state while the vehicle is traveling in the state where the lock-up clutch 2a is engaged (LU state) and reaches the third vehicle speed VSP3 which is set to a vehicle speed lower than the first vehicle speed VSP1, the lock-up clutch 2a is disengaged. The timing to disengage the lock-up clutch 2a is when the gear train 3a is in the in-gear state at the third speed position. Therefore, during the brake deceleration, the engagement of the lock-up clutch 2a is maintained until the vehicle speed reaches the third vehicle speed VSP3 at a timing later than that when the normal mode is selected, and the fuel efficiency is improved as compared with that when the normal mode is selected.

In the fuel control when the eco-mode is selected, during the brake deceleration in a fuel cut state and a brake operation ON state, when a request of the 4→3 coast downshift in which the vehicle speed is at a higher vehicle speed side higher than the third vehicle speed VSP3 is issued, the state is shifted from the fuel cut (F/C) state to the torque up recovery (TUR) state during the 4→3 coast downshift. That is, in a traveling scene in which the sensitivity of the driver to the front-rear acceleration fluctuation of the vehicle is low during the brake deceleration associated with the brake operation of the driver, as compared with that in the brake operation OFF state, shifting to the torque up recovery state is allowed during the 4→3 coast downshift. Therefore, by shifting the state to the torque up recovery state in response to the request of the 4→3 coast downshift, the shift responsiveness of the 4→3 coast downshift during the brake deceleration can be improved.

In the fuel control when the eco-mode is selected, when the torque up recovery is finished, the state returns from the torque up recovery state to the fuel cut state, and when the vehicle speed decreases and reaches the third vehicle speed VSP3 in the fuel cut state, the state is shifted from the fuel cut state to the fuel cut recovery state. That is, when the torque up recovery is finished, the fuel is consumed in a section from the timing when the torque up recovery is finished to the timing when the vehicle speed reaches the third vehicle speed VSP3 in a case where the state is shifted from the torque up recovery state to the fuel cut recovery state. On the other hand, by returning the state to the fuel cut state in the section from the timing when the torque up recovery is finished to the timing when the vehicle speed reaches the third vehicle speed VSP3, the fuel consumption can be reduced in a brake deceleration section before the vehicle speed reaches the third vehicle speed VSP3 in which the lock-up clutch 2a is disengaged.

Here, in the lock-up control, the first vehicle speed VSP1, the second vehicle speed VSP2, and the third vehicle speed VSP3 are set in in-gear vehicle speed regions excluding a vehicle speed region in which the coast downshift is executed. That is, the first vehicle speed VSP1 is set in a third-speed in-gear vehicle speed region, the second vehicle speed VSP2 is set in a fourth-speed in-gear vehicle speed region, and the third vehicle speed VSP3 is set in a third-speed in-gear state vehicle speed region.

For example, when the first vehicle speed VSP1, the second vehicle speed VSP2, and the third vehicle speed VSP3, which are the lock-up disengagement vehicle speeds, are set in a vehicle speed region during execution of the coast downshift, a disengagement operation of the lock-up clutch 2a and a shift operation based on switching the friction elements are executed in an overlapping manner. In this case, the input torque applied to the gear train 3a fluctuates due to the disengagement of the lock-up clutch 2a during the shift, and shift quality of the coast downshift deteriorates. On the other hand, by setting the disengagement vehicle speed of the lock-up clutch 2a in the in-gear vehicle speed region, the disengagement operation of the lock-up clutch 2a does not overlap the shift operation in the coast downshift, and the shift quality of the coast downshift can be ensured.

As described above, the control device for the vehicle (the engine vehicle) of the first embodiment exerts the effects listed below.

(1) The control device for a vehicle includes the lock-up control unit 102 configured to control engagement/disengagement of the lock-up clutch 2a of the torque converter 2 interposed between the engine 1 and the stepped transmission mechanism (the gear train 3a), and the driving mode selection unit 103 configured to select any one of the first driving mode and the second driving mode.

The lock-up control unit 102 is configured to:

in a case where the first driving mode is selected, disengage the lock-up clutch 2a when the vehicle speed VSP decreases and reaches the first vehicle speed VSP1 while the vehicle is traveling in a state where the lock-up clutch 2a is engaged, in a case where the second driving mode is selected, disengage the lock-up clutch 2a when the vehicle speed VSP decreases and reaches the second vehicle speed VSP2 in the brake operation OFF state while the vehicle is traveling in the state where the lock-up clutch 2a is engaged, in the case where the second driving mode is selected, disengage the lock-up clutch 2a when the vehicle speed VSP decreases and reaches the third vehicle speed VSP3 in the brake operation ON state while the vehicle is traveling in the state where the lock-up clutch 2a is engaged, and set the third vehicle speed VSP3 to a vehicle speed lower than the first vehicle speed VSP1, and set the second vehicle speed VSP2 to a vehicle speed higher than the first vehicle speed VSP1.

Therefore, in a deceleration scene in the second driving mode, both improvement in the running experience due to an idle running feeling during the coasting deceleration traveling and improvement in the fuel efficiency during the brake deceleration traveling can be achieved, as compared with the deceleration scene in the first driving mode.

(2) The first driving mode is the normal mode, and the second driving mode is the eco-mode.

Therefore, in the deceleration scene in the eco-mode, the driving performance request and the fuel efficiency request depending on presence or absence of a brake operation of the driver are reflected, and both improvement in the running experience due to the idle running feeling during the coasting deceleration traveling and improvement in the fuel efficiency during the brake deceleration traveling can be achieved.

(3) The control device further includes the shift control unit 101 configured to perform a shift control for switching a plurality of gear positions in the stepped transmission mechanism (the gear train 3a) based on the operating point (VSP, APO) that is determined by the vehicle speed VSP and the accelerator pedal opening APO, and a shift map.

The lock-up control unit 102 is configured to set the first vehicle speed VSP1, the second vehicle speed VSP2, and the third vehicle speed VSP3 in an in-gear vehicle speed region excluding a vehicle speed region in which the coast downshift is executed.

Therefore, the disengagement operation of the lock-up clutch 2a does not overlap the shift operation in the coast downshift, and the shift quality of the coast downshift can be ensured.

(4) The control device further includes the fuel control unit 110 configured to switch the engine among a fuel cut state in which fuel supply to the engine 1 is cut off, a torque up recovery state in which fuel supply to a part of cylinders of the engine 1 is recovered, and a fuel cut recovery state in which fuel supply to all of the cylinders of the engine 1 is recovered.

The lock-up control unit 102 is configured to, in a case where the first driving mode is selected, when a request of coast-downshifting is issued at a vehicle speed higher than the first vehicle speed VSP1 during deceleration in the fuel cut state, output, to the fuel control unit 110, a request for shifting the state from the fuel cut state to the torque up recovery state during the coast downshift, and when the coast downshift is finished, output, to the fuel control unit 110, a request for shifting the state from the torque up recovery state to the fuel cut recovery state.

Therefore, in the case where the first driving mode is selected, when a request of coast-downshifting is issued at a higher vehicle speed side higher than the first vehicle speed VSP1, by shifting the state to the torque up recovery state, a shift progress speed of the coast downshift can be increased while suppressing an uncomfortable feeling in the shift. In addition, in the case where the first driving mode is selected, by shifting the state to the fuel cut recovery state when the coast downshift is finished, when re-acceleration is requested, it is possible to respond to the re-acceleration request with good responsiveness.

(5) The lock-up control unit 102 is configured to, in a case where the second driving mode is selected, output, to the fuel control unit 110, a request for shifting the state from the fuel cut state to the fuel cut recovery state when the vehicle speed reaches the second vehicle speed VSP2 during a coasting deceleration in the fuel cut state and the brake operation OFF state, instead of outputting a request for shifting the state to the torque up recovery state even when a request of coast-downshifting is issued at a vehicle speed higher than the second vehicle speed VSP2.

Therefore, in a case where the second driving mode is selected, the lock-up clutch 2a is disengaged when the vehicle speed reaches the second vehicle speed VSP2 during the coasting deceleration, and an idle running state (a sailing traveling state) can be ensured in a long coasting deceleration section after the second vehicle speed VSP2 is reached. In addition, in a case where the second driving mode is selected, during the coasting deceleration, by not shifting the state to the torque up recovery state even when a request for coast-downshifting is issued at a vehicle speed higher than the second vehicle speed VSP2, an uncomfortable feeling of the driver can be prevented.

(6) The lock-up control unit 102 is configured to:

in a case where the second driving mode is selected, when a request of coast-downshifting is issued at a vehicle speed higher than the third vehicle speed VSP3 during a brake deceleration in the fuel cut state and the brake operation ON state, output, to the fuel control unit 110, a request for shifting the state from the fuel cut state to the torque up recovery state during the coast downshift, when the torque up recovery is finished, output, to the fuel control unit 110, a request for returning the state from the torque up recovery state to the fuel cut state, and when the vehicle speed decreases and reaches the third vehicle speed VSP3 in the fuel cut state, output, to the fuel control unit 110, a request for shifting the state from the fuel cut state to the fuel cut recovery state.

Therefore, in a case where the second driving mode is selected, when a request of coast-downshifting is issued at a vehicle speed higher than the third vehicle speed VSP3, by shifting the state to the torque up recovery state, a shift progress speed of the coast downshift can be increased while suppressing an uncomfortable feeling in the shift. In addition, in a case where the second driving mode is selected, when the torque up recovery is finished, by returning the state from the torque up recovery state to the fuel cut state, the fuel consumption can be reduced in the brake deceleration section before the vehicle speed reaches the third vehicle speed VSP3 in which the lock-up clutch 2a is disengaged.

The control device for the vehicle according to the embodiment of the invention has been described above with reference to the first embodiment. However, a specific configuration is not limited to that of the first embodiment, and a change, an addition, and the like in design are allowed as long as the configuration does not depart from a gist of an invention according to each claim in the scope of claims.

The first embodiment shows an example of the driving mode selection unit 103 that selects the normal mode as the first driving mode and the eco-mode as the second driving mode. However, the driving mode selection unit may select a driving mode (a sport mode or the like) other than the normal mode and the eco-mode. In this case, the sport mode may be set as the first driving mode, and the normal mode in which fuel efficiency is emphasized as compared with the sport mode may be set as the second driving mode. Accordingly, even when there is a mode other than the normal mode and the eco-mode, in a deceleration scene in the second driving mode, both improvement in the running experience due to an idle running feeling during the coasting deceleration traveling and improvement in the fuel efficiency during the brake deceleration traveling can be achieved, as compared with the deceleration scene in the first driving mode.

The first embodiment shows, as an automatic transmission, the automatic transmission 3 that achieves nine forward speeds and one reverse speed by engagement of three friction elements. However, the automatic transmission may be one that achieves a plurality of forward speeds and one reverse speed by engaging two friction elements, or one that achieves a plurality of forward speeds and one reverse speed by engaging four friction elements. In addition, the automatic transmission may be a stepped automatic transmission having a gear position other than those of the nine forward speeds and one reverse speed, or a continuously variable transmission with a sub-transmission in which a belt continuously variable transmission and a multi-stage transmission are combined.

The first embodiment shows a control device for the vehicle to be mounted on an engine vehicle. However, the present invention can be applied not only to an engine vehicle but also as a control device for a hybrid vehicle equipped with an engine.

The present application claims a priority under Japanese Patent Application No. 2019-216985 filed to Japan Patent Office on Nov. 29, 2019, and an entire content of this application are incorporated herein by reference.

The invention claimed is:

1. A control device for a vehicle, comprising:
a lock-up controller programmed to control engagement/disengagement of a lock-up clutch of a torque converter interposed between an engine and a stepped transmission mechanism; and
a driving mode selector configured to select any one of a first driving mode and a second driving mode, wherein
the lock-up controller is further programmed to:
in a case where the first driving mode is selected, disengage the lock-up clutch when a vehicle speed decreases and reaches a first vehicle speed while the vehicle is travelling in a state where the lock-up clutch is engaged,
in a case where the second driving mode is selected, disengage the lock-up clutch when the vehicle speed decreases and reaches a second vehicle speed in a brake operation OFF state while the vehicle is travelling in the state where the lock-up clutch is engaged,
in the case where the second driving mode is selected, disengage the lock-up clutch when the vehicle speed decreases and reaches a third vehicle speed in a brake operation ON state while the vehicle is travelling in the state where the lock-up clutch is engaged, and
set the third vehicle speed to a vehicle speed lower than the first vehicle speed, and set the second vehicle speed to a vehicle speed higher than the first vehicle speed.

2. The control device for a vehicle according to claim 1, wherein
the first driving mode is a normal mode, and the second driving mode is an eco-mode.

3. The control device for a vehicle according to claim 1, further comprising:
a shift controller programmed to perform a shift control for switching a plurality of gear positions in the stepped transmission mechanism based on an operating point that is determined by a vehicle speed and an accelerator pedal opening, and a shift map, wherein
the lock-up controller is further programmed to set the first vehicle speed, the second vehicle speed, and the third vehicle speed in an in-gear vehicle speed region excluding a vehicle speed region in which coast downshift is executed.

4. The control device for a vehicle according to claim 3, further comprising:
a fuel controller programmed to switch the engine among a fuel cut state in which fuel supply to the engine is cut off, a torque up recovery state in which fuel supply to a part of cylinders of the engine is recovered, and a fuel cut recovery state in which fuel supply to all of the cylinders of the engine is recovered, wherein
the lock-up controller is further programmed to:
in a case where the first driving mode is selected, when a request of coast-downshifting is issued at a vehicle speed higher than the first vehicle speed during deceleration in the fuel cut state, output a request for shifting the state from the fuel cut state to the torque up recovery state during the coast downshift to the fuel controller, and
when the coast downshift is finished, output a request for shifting the engine from the torque up recovery state to the fuel cut recovery state to the fuel controller.

5. The control device for a vehicle according to claim 4, wherein
the lock-up controller is further programmed to, in a case where the second driving mode is selected, output, to the fuel controller, a request for shifting the state from the fuel cut state to the fuel cut recovery state when the vehicle speed reaches the second vehicle speed during a coasting deceleration in the fuel cut state and the brake operation OFF state, instead of outputting a request of shifting the state to the torque up recovery state even when a request of coast-downshifting is issued at a vehicle speed higher than the second vehicle speed.

6. The control device for a vehicle according to claim 4, wherein
the lock-up controller is further programmed to:
in a case where the second driving mode is selected, when a request of coast-downshifting is issued at a vehicle speed higher than the third vehicle speed during a brake deceleration in the fuel cut state and the brake operation ON state, output, to the fuel controller, a request for shifting the state from the fuel cut state to the torque up recovery state during the coast downshift, when the torque up recovery is finished, output, to the fuel controller, a request for returning the state from the torque up recovery state to the fuel cut state, and when the vehicle speed decreases and reaches the third vehicle speed in the fuel cut state, output, to the fuel controller, a request for shifting the state from the fuel cut state to the fuel cut recovery state.

7. A control method for a vehicle, the control method being for controlling engagement/disengagement of a lock-up clutch of a torque converter interposed between an engine and a stepped transmission mechanism, and selecting any one of a first driving mode and a second driving mode, the control method comprising:

disengaging, in a case where the first driving mode is selected, the lock-up clutch when a vehicle speed decreases and reaches a first vehicle speed while the vehicle is travelling in a state where the lock-up clutch is engaged;

disengaging, in a case where the second driving mode is selected, the lock-up clutch when the vehicle speed decreases and reaches a second vehicle speed in a brake operation OFF state while the vehicle is travelling in the state where the lock-up clutch is engaged;

disengaging, in the case where the second driving mode is selected, the lock-up clutch when the vehicle speed decreases and reaches a third vehicle speed in a brake operation ON state while the vehicle is travelling in the state where the lock-up clutch is engaged; and setting the third vehicle speed to a vehicle speed lower than the first vehicle speed, and setting the second vehicle speed to a vehicle speed higher than the first vehicle speed.

8. A non-transitory computer-readable medium storing a program executable by a computer of a vehicle having a lock-up clutch of a torque converter interposed between an engine and a stepped transmission mechanism and a driving mode selector configured to select any one of a first driving mode and a second driving mode, the program causing the computer to execute:

in a case where the first driving mode is selected, disengaging the lock-up clutch when a vehicle speed decreases and reaches a first vehicle speed while the vehicle is travelling in a state where the lock-up clutch is engaged, in a case where the second driving mode is selected, disengaging the lock-up clutch when the vehicle speed decreases and reaches a second vehicle speed in a brake operation OFF state while the vehicle is travelling in the state where the lock-up clutch is engaged, in the case where the second driving mode is selected, disengaging the lock-up clutch when the vehicle speed decreases and reaches a third vehicle speed in a brake operation ON state while the vehicle is travelling in the state where the lock-up clutch is engaged, and setting the third vehicle speed to a vehicle speed lower than the first vehicle speed, and setting the second vehicle speed to a vehicle speed higher than the first vehicle speed.

* * * * *